Jan. 11, 1927.

E. E. REISINGER ET AL 1,613,805

HEADLIGHT PILOT

Filed Feb. 9, 1925

Inventors.
Everett E. Reisinger.
Walter H. Reisinger.
By Lyon & Lyon
Attorneys.

Patented Jan. 11, 1927.

1,613,805

UNITED STATES PATENT OFFICE.

EVERETT E. REISINGER, OF LOS ANGELES, CALIFORNIA, AND WALTER H. REISINGER, OF PORTLAND, OREGON.

HEADLIGHT PILOT.

Application filed February 9, 1925. Serial No. 7,863.

This invention relates to a headlight pilot, the function of which is to indicate whether a light, such as a headlight of an automobile, is lighted. Sometimes where an automobile is running through a well lighted street, the headlights may be unlit and this fact be unnoticed by the driver of the car, thereby rendering him subject to arrest. The general object of the invention is to produce a headlight pilot of simple construction which can be readily attached to a headlight without the use of tools and without necessitating the drilling of holes or making any connections to the metal parts of the car or headlight. A further object of the invention is to produce a device of this kind which can be readily formed from a sheet metal blank.

Further objects of the invention will appear hereinafter.

The invention consists in the novel parts and combination of parts to be described hereinafter, all of which contribute to produce an efficient headlight pilot.

A preferred embodiment of the invention is described in the following specification, while the scope of the invention is pointed out in the appended claims.

Figure 1:
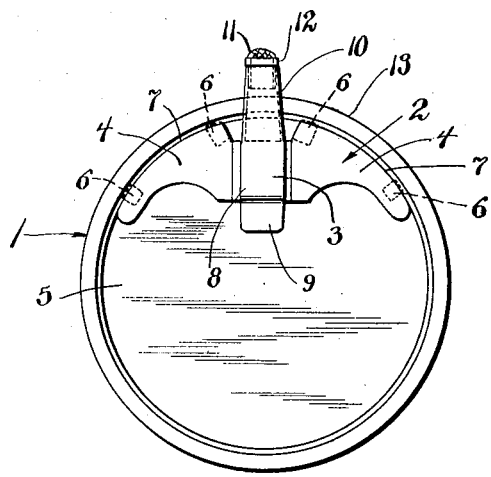
Fig. 1 is a front elevation of a headlight embodying the invention.

In the embodiment of the invention illustrated, the pilot comprises a body having means for engaging the edge of the headlight lens and operating to secure the body to the lens. This body also has a reflector before the lens which receives the light from the headlight and reflects the same beyond the edge of the headlight. The body of the device carries means beyond the edge of the headlight casing which is illuminated by these reflected rays to indicate whether the light of the headlight is lit or not.

In the present embodiment, 1 represents a headlight to which the pilot 2 is represented as attached. The pilot has a body 3 which is preferably formed at its lower portion into a plate comprising two wings 4 which are intended to lie flat against the forward face of the lens or glass 5 at the front of the headlight.

The body 3 is provided with socket means for receiving the edge of the lens 5 to secure it to the same, and this means is preferably integral clips 6 that are bent inwardly and which are located on the upper and circumferential edge 7 of each wing 4. The lower portion of the body 3, that is to say, the part indicated by the numeral 8, is of substantially U-section or rectangular cross section, so that the body at this point is of channel shape with the open side of the channel disposed toward the lens 5. This permits the light rays from the lamp of the headlight to pass outwardly or upwardly when reflected. In order to reflect the rays outwardly or upwardly in this way, a tongue 9 may be provided which extends downwardly at about an angle of 45°, the upper side of the same being provided with a reflecting surface which reflects the rays upwardly. The body 3 includes an extension 10 which projects beyond the edge of the lamp casing 1 and is provided with means which is illuminated by the reflected rays. In the present instance, this means is in the form of a button 11 of glass or other translucent material, preferably cut with facets which will refract the rays and increase the effect of the illumination from the reflected rays.

Figure 2:
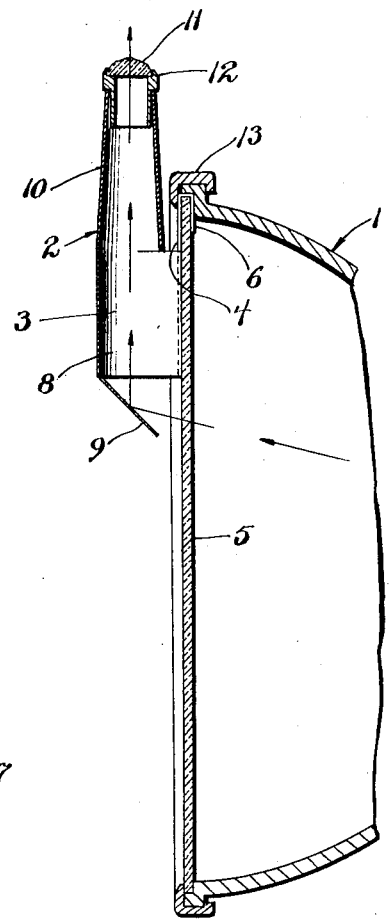
Fig. 2 is a vertical section through the forward portion of the headlight and through one of the headlight pilots mounted in position; in this view a portion of the headlight casing is broken away.

The button is preferably of colored glass, and projects on its upper side slightly above the retaining ferrule 12 which carries the button (see Fig. 2). The extension 10 is preferably of tubular form and slightly tapered.

By reason of the U form or channel form of cross section of the lower end of the body 3, it will be evident that this part of the body has a desirable resiliency which enables the wings 4 to adapt themselves to fit against the edges of lenses of different diameters.

It is unnecessary to use any special means for holding the device in position; it is simply necessary to attach it to the edge of the lens, preferably at the upper edge, and then place the lens in the headlight casing in the usual way. In the present instance, a retaining ring 13 is indicated, such as attaches to the edge of the casing of a headlight and projects over the edge of the lens.

Figure 3:
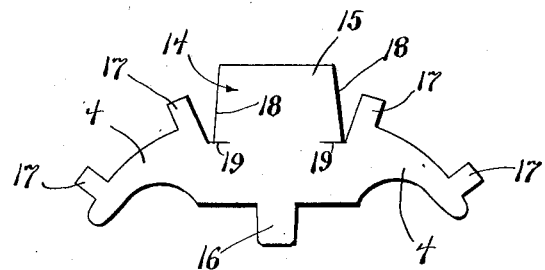
Fig. 3 is a plan of a blank from which the pilot may be very expeditiously produced.

The headlight pilot is preferably constructed from a blank 14 having the characteristics indicated in Fig. 3, that is to say, it presents two laterally disposed wings 4 with the upwardly extending tapered panel 15 which is bent around to form the tubular extension 10, the lower portion of the blank 14 being provided with an integral tongue 16 which extends downwardly and which, when completed, constitutes the reflecting tongue 9.

The clips 6 are first formed as outwardly projecting fingers 17 on the blank, which are bent over and inwardly to form the clips to engage the edge of the lens. In forming the extension 10, the side edges 18 of the panel 15 are brought together and soldered. This is facilitated by producing slits 19 extending inwardly toward the vertical central axis of the blank at the lower portion of the panel 15.

The plate out of which the pilot is formed need not be of spring material, but it is merely necessary for it to be slightly resilient; any ordinary thin sheet metal is satisfactory for this purpose.

What we claim is:—

1. In a headlight pilot for automobiles, the combination of a body having a plate at its lower portion with means for securing the same before the lens of the headlight, said body being open at its rear lower portion so as to receive the light from the headlight, and having an upwardly projecting tubular extension projecting beyond the edge of the headlight, a refracting button at its upper end, the lower portion of said body having a reflecting surface below and in line with the bottom of the button operating to reflect rays of light upwardly and through the bottom of the button, the upper portion of said button operating to permit the light rays to pass laterally toward the rear of the automobile.

2. In a headlight pilot for automobiles, the combination of a body having a plate at its lower portion with clips at its edge to engage the edge of the headlight lens, and operating to secure the body to the lens, said body being open at its rear lower portion so as to receive light from the headlight and having an upwardly projecting tubular extension projecting beyond the edge of the headlight and carrying a refracting button, the lower portion of said body having a downwardly extending tongue with a reflecting surface toward the lens and operating to reflect rays of light upwardly and onto the button.

EVERETT E. REISINGER.
WALTER H. REISINGER.